United States Patent [19]

Iannadrea et al.

[11] 4,183,665

[45] Jan. 15, 1980

[54] APPARATUS FOR TESTING THE PRESENCE OF COLOR IN A PAPER SECURITY

[75] Inventors: Gerald Iannadrea, Painesville; Robert L. Gorgone, Mentor, both of Ohio

[73] Assignee: Ardac, Inc., Willoughby, Ohio

[21] Appl. No.: 858,115

[22] Filed: Dec. 7, 1977

[51] Int. Cl.[2] ............................................... G06K 5/00

[52] U.S. Cl. ....................................... 356/71; 250/556

[58] Field of Search .................. 356/71; 250/556, 557, 250/571

[56] References Cited

U.S. PATENT DOCUMENTS

| | | | |
|---|---|---|---|
| 3,122,227 | 2/1964 | Bookout et al. | 356/71 |
| 3,211,268 | 10/1965 | Dills et al. | 356/71 |
| 3,220,549 | 11/1965 | Wong | 209/581 |
| 3,275,138 | 9/1966 | Cahill | 356/71 |
| 3,491,243 | 1/1970 | Tsugami | 356/71 |
| 3,916,194 | 10/1975 | Novak et al. | 250/556 |

*Primary Examiner*—Vincent P. McGraw

*Attorney, Agent, or Firm*—Oldham, Oldham, Hudak & Weber

[57] ABSTRACT

Disclosed is apparatus for determining the authenticity of paper purported to be valid currency or the like. The invention includes a sliding tray which is adapted for receiving the paper. Maintained above the tray are a light source and three photocells. The light source casts light upon the paper as the tray is passed thereunder and light is reflected from the paper's surface onto two of the photocells. Appropriate filtering causes each of the two photocells to respond to different wavelengths of light reflected from the paper, these wavelengths corresponding to colors known to be present along the path traveled by the paper as it passes under the photocells. The outputs of the photocells are thus indicative of the presence and relative positions of colored areas upon the surface of the paper. Circuitry is included to receive and compare the outputs of the photocells with each other and with the output of a reference photocell, thereby determining the authenticity of the paper. The apparatus may be used in conjunction with a reticle validation test apparatus as a secondary validation test.

12 Claims, 5 Drawing Figures

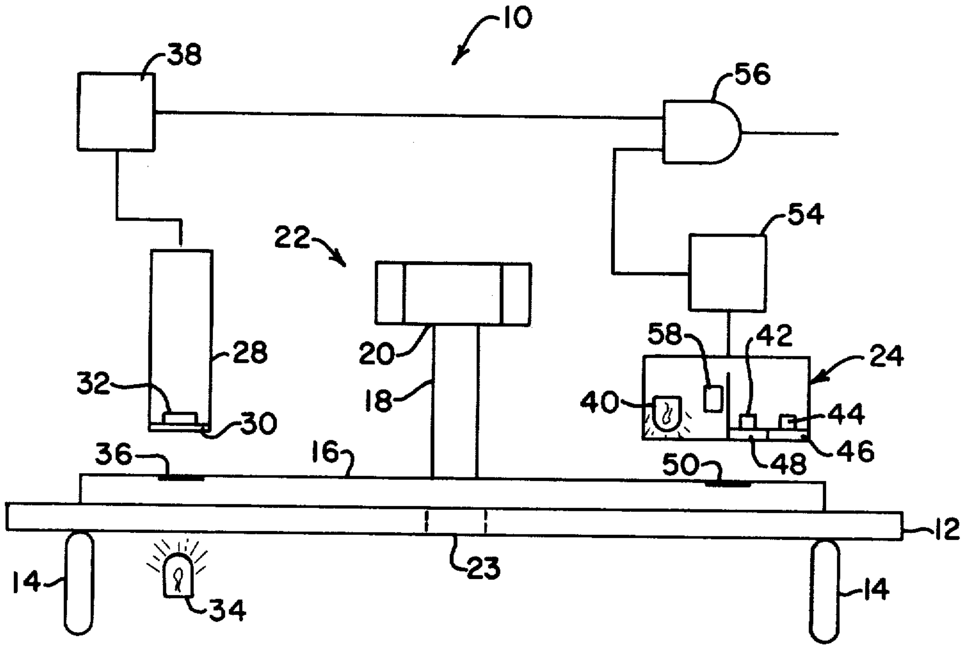
FIG. 1A
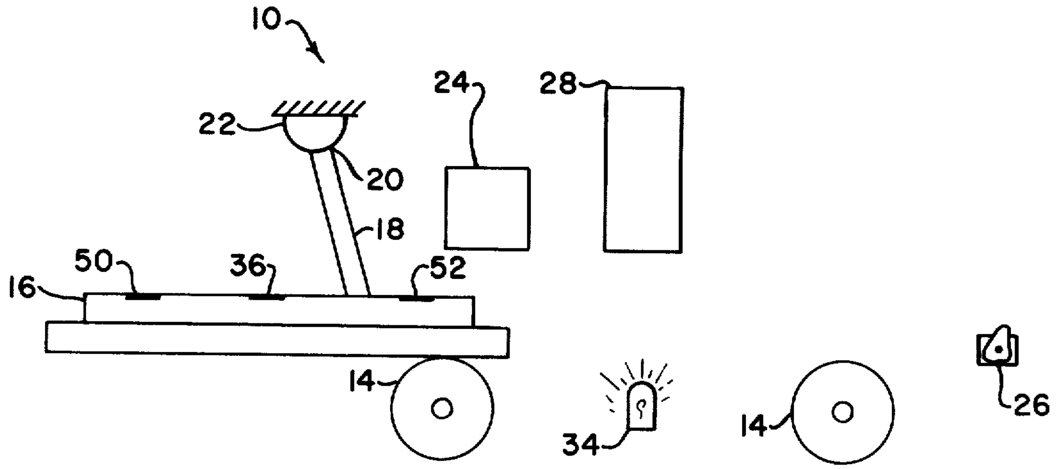
FIG. 1B
FIG. - 1

APPARATUS FOR TESTING THE PRESENCE OF COLOR IN A PAPER SECURITY

BACKGROUND OF THE INVENTION

The invention herein rests in the art of security validation apparatus. Heretofore, numerous devices have been known for testing the authenticity of a paper purported to be a valid note, security, currency, or the like. In many known devices a reticle is used for masking or matching a complementary grid pattern characterizing the valid paper; the reticle effectively being a negative of the grid pattern. However, in recent years highly sophisticated photocopy machines which are capable of reproducing such grid patterns have been developed. Such photocopy machines are capable of passing the reticle test, causing the validation apparatus to accept mere copies as valid paper. It is known that many paper securities are characterized by the presence of colored areas thereon. Since photocopies generally are of a black and white nature, a secondary test, testing for the presence of colored areas, would be desirable. Even those devices capable of reproducing color are generally not capable of accurate reproduction thereof. Further, those persons attempting to pass copies as originals would normally not be aware of the fact that a secondary test is being performed. Consequently, a secondary test sensing the presence of particular colored areas on a security would provide a significant supplement to the primary reticle test of security validation apparatus.

To further discriminate against invalid paper, it is preferable that certain areas of the paper be tested for the presence of various colors and the proportionate degree to which each of the various colors exist within the area. By testing these areas on a ratio basis, determining the relative amount of one color present with respect to another, the test becomes more difficult to pass and the test inherently compensates for the degradation of the quality of the paper due to wear or age while simultaneously compensating for a similar degradation in the testing device.

OBJECTS OF THE INVENTION

Consequently, it is an object of the instant invention to present an apparatus for testing the presence of color in a paper security which senses the presence or absence of colors within a paper purported to be a valid instrument.

Another object of the invention is to present an apparatus for testing the presence of colors in a paper security which senses the presence of colors in various areas along the security.

A further object of the invention is to present an apparatus for testing the presence of colors in a paper security which operates in conjunction with a primary reticle test and senses the colored areas on a security in positional relationship with the grid pattern being tested in the primary test.

Yet another object of the invention is to present an apparatus for testing the presence of color in a paper security wherein at least two sensors operate upon the same areas of the paper to determine the relative proportion of colors present in each such area.

Still a further object of the invention is to present an apparatus for testing the presence of colors in a paper security which can readily be added to existing security validation devices as a secondary test and which is relatively simplistic in construction, reliable in operation, highly discriminatory in testing, and readily conducive to implementation with state-of-the-art components.

SUMMARY OF THE INVENTION

The foregoing objects and other objects which will become apparent as the detailed description proceeds are achieved by the improvement in an apparatus for determining the validity of a paper offered as a valid security, comprising a slidable tray for receiving the paper and transporting the same to a primary test position; a reticle sensor for scanning a grid pattern on the paper; and a primary circuit receiving an output from the reticle sensor and for determining, in the first instance, the validity of the paper; said improvement comprising: a light source in juxtaposition to said tray and casting light upon a path across said paper as the tray transports the paper; light sensing means adjacent said light source for receiving light of predetermined colors reflected from said path across said paper; and circuit means connected to said light sensing means and receiving signals therefrom for determining the presence of said predetermined colors and the positional sequence thereof along said path and thereby determining the validity of the paper.

DESCRIPTION OF THE DRAWINGS

For a complete understanding of the objects, structure, and technique of the invention reference should be had to the following detailed description and accompanying drawings wherein:

FIG. 1, comprising FIGS. 1A and 1B, is an illustrative showing of the fundamental structure of the invention from the front and side views of the tray receptacle respectively;

DETAILED DESCRIPTION OF PREFERRED EMBODIMENT

Figures 2, 2A, 2B:
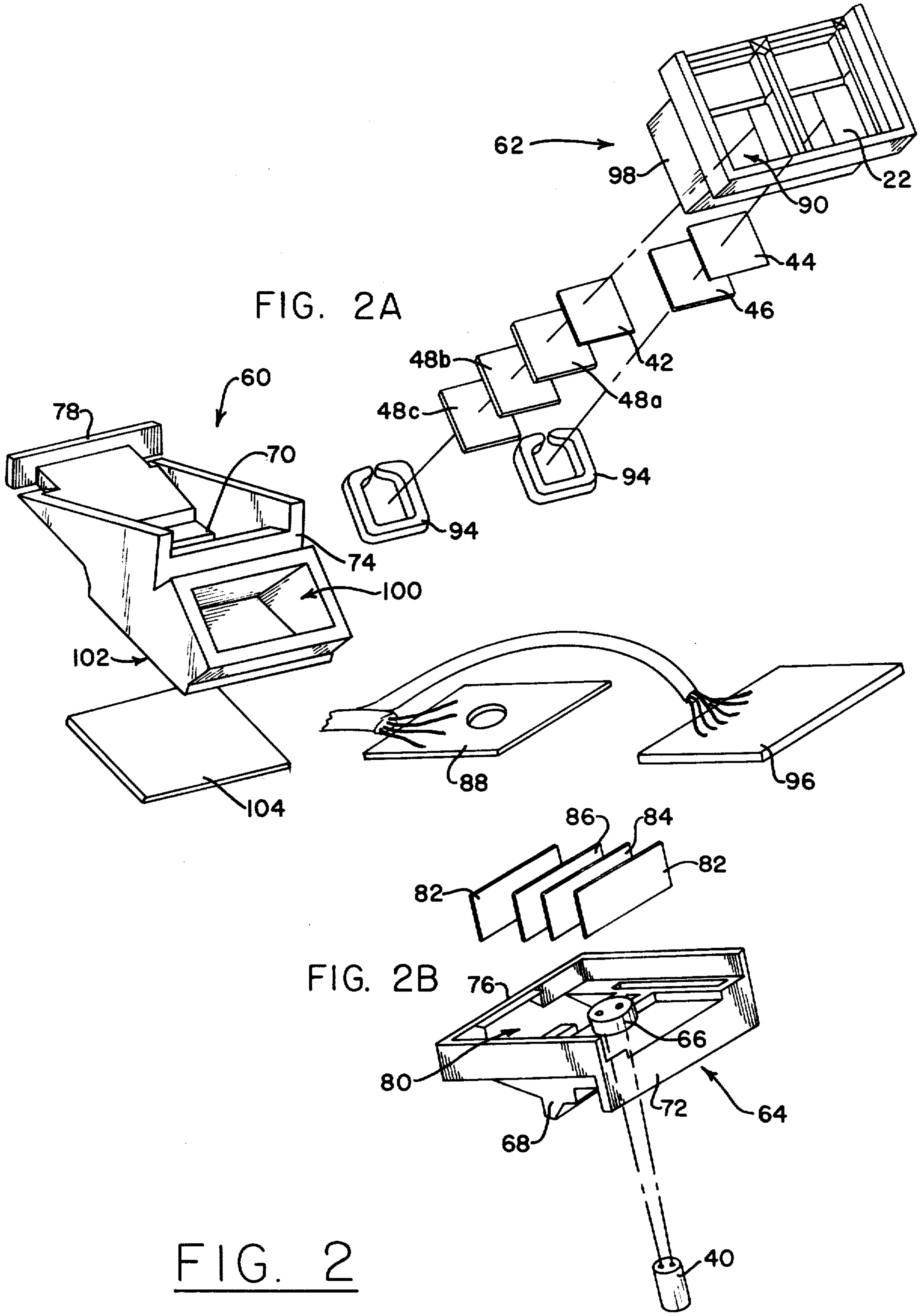
FIG. 2, comprising
FIGS. 2A and 2B, is an assembly drawing of the physical structure of the color sensor of the invention.

Referring now to the drawings and more particularly FIG. 1, it can be seen that a security validation apparatus is designated generally by the numeral 10. As is known in the art, a tray 12 is slidably mounted upon rollers 14 and is of appropriate size to receive thereon a paper security or currency 16. The tray 12 is preferably transparent and the rollers 14 can readily be substituted by means of a track or ways upon which the tray 12 might slide. A tray switch 22 is maintained above the tray 12 and is characterized by an arm 18 which is pivotally connected as at 20. In the absence of the paper 16, the arm 18 passes through a slot 23 within the tray 12. When the paper 16 is placed onto the tray 12, the arm 18 is contacted thereby and is pivotally moved from the slot 23 as in the manner shown in FIG. 1B, thus actuating the tray switch 22. This actuation energizes the color sensor 24 and prepares the system for the testing operation to be discussed hereinafter.

With the paper 16 placed upon the tray 12 in a prescribed fashion, the tray may be slid across the rollers 14 with the color sensor 24 performing its secondary test. The tray 12 comes into contact with a cam linkage 26 which actuates a primary sensor 28. This sensor 28, as is known in the art, comprises a reticle 30 and photocell 32 and, under control of the cam linkage 26, is caused to mechanically scan a grid pattern 36 upon the paper 16. A lamp 34, illuminated by the tray switch 22 is maintained in juxtaposition to the primary sensor 28 with the grid pattern 36 being interposed therebetween. The scanning of the grid pattern 36 by the primary sensor 28 results in a pulsating of the light impinging upon the photocell 32 with a resultant AC signal being passed to the primary detection circuitry 38. As is known in the art, a counting of the pulses, a test of their amplitude, or a determination of their frequency is made by the primary detection circuitry 38 to determine, in the first instance, the authenticity of the paper 16.

While the tray 12 is passing upon the rollers 14, the color sensor 24 is operative. While a detailed description of this apparatus will be presented hereinafter, it should be noted that the sensor 24 includes a lamp 40 which is illuminated by actuation of the tray switch 22. The lamp 40 casts light upon the surface of the paper 16, through appropriate filters 46,48, and upon the photocells 42,44. As the paper 16 passes beneath the sensor 24, the amount of reflected light sensed by the photocells 42,44 varies as a function of the color of the surface of the paper 16 and the particular characteristics of the filters 46,48. It should be noted that the paper 16 is preferably characterized by the presence of the areas 50,52 which are of the same color. The filters 46,48, different from each other, are selected upon the basis of the color of the areas 50,52, in a manner to be discussed hereinafter. While certain modifications could readily be made to the invention such that the areas 50,52 need not be of the same color, the description hereinafter is premised on the assumption that the areas are substantially the same.

Also included within the color sensor 24 is a reference photocell 58 which receives light directly from the lamp 40 and emits a reference voltage signal characteristic of the lamp intensity. The photocells 42,44 respectively emit electrical signals indicative of the reflected light received through the filters 46,48 from the paper 16. The outputs of the photocells 42,44,58 are passed to the secondary detection circuitry 54 to be later discussed in detail. Suffice it to say that the circuitry 54 makes comparative tests, or determines the ratios of the output signal strength of the cells 42,44,58, and determines the authenticity of the paper 16 as a function thereof. As a consequence of the operation of the sensor 24 and the determination made by the circuit 54 respecting the signals received therefrom, the circuit 54 emits an output relative to the authenticity of the paper 16. The outputs of the primary detection circuit 38 and the secondary detection circuit 54 are passed to an AND gate 56 which emits an output signal indicative of validity if, and only if, the outputs of the circuits 38,54 are both indicative of validity.

An appreciation of the physical structure of the color sensor 24 may be had by a reference to FIG. 2. Here it can be seen that the element 24 fundamentally consists of a bottom housing 60, a sensor cell housing 62, and a reference cell housing 64; the former two elements being depicted in FIG. 2A, and the latter being shown in FIG. 2B. The reference cell housing 64 includes a collar 66 through which pass the leads of the lamp 40. A depending extrusion 68 characterizes a bottom portion of the housing 64 and is adaptable for reception by the receptacle 70 of the bottom housing 60. Indeed, the receptacle 70 is contoured for mating engagement with the extrusion 68. A flange 72, at one end of the housing 64, is adaptable for sealing engagement with the surface 74 of the housing 60, while the edge 76 is adapted for secured engagement between the tab 78 and the body of the casing 60.

The housing 64, when received by the housing 60 as set forth above, defines a cavity 80 for receiving the reference cell 58. Transparent shims 82 and appropriate filters 84,86 are provided in secured engagement over a window (not shown) maintained within the depending extrusion 68. This window provides for cmmunication from the incandescent lamp 40 to the reference photocell 58 as the same is maintained within the cavity 80. The filters 84,86 are provided such that the reference cell 58 responds to the same wavelengths of light as does one of the sensor cells 42,44. The reference cell housing 64 is sealed at the top thereof by means of a printed circuit board 88 covering the cavity 80. This printed circuit board interconnects with the lamp 40 and reference cell 58. The unit 64, capped by the circuit board 88, is received by the bottom housing 60 as mentioned above.

As shown in FIG. 2A, the sensor cell housing 62 is characterized by cavities 90,92 for respectively receiving the sensor photocells 42,44 and appropriate filters 48*a–c* and 46. The sensor cells and filters are retained within the cavities 90,92 by means of the filter rings 94, serving as keepers. Capping the housing 62 is a printed circuit board 96 which makes electrical connection with the sensor cells 42,44. The projection 98 is adapted for reception by the cavity 100 of the bottom housing 60.

The bottom housing 60 is characterized by an opening on the bottom side thereof designated by 102. A window 104 is maintained over the opening 102 for sealing the same. When illuminated, the lamp 40 emits light through the window 104 and upon the surface of the paper 16. Light is reflected back from the paper 16, through the window 104, and after passing through the associated filters 46,48, impinges upon the sensor cells 42,44. As mentioned above, the lamp 40 also directs light through the filters 84,86 and upon a reference photocell 58. It should also be noted that the surface 74 of the housing 60 is extended to contact the window 104 to provide a shield separating direct light from passing from the lamp 40 to the cells 42,44.

It should be briefly noted with respect to the physical structure of the color sensor 24, that the elements 60,62,64 may be of any suitable material, but are preferably constructed of a white propionate material due to its light reflectance characteristics. The elements 60–64 are preferably sealed together by means of applying a liquid propionate to the areas of interengagement. This liquid propionate may be readily produced by mixing methylene chloride with the white propionate. The color sensor 24, as constructed above, may then be mounted above the tray 12 as illustrated in FIG. 1 by securing it with screws, mastic, adhesive, or the like.

Figure 3:
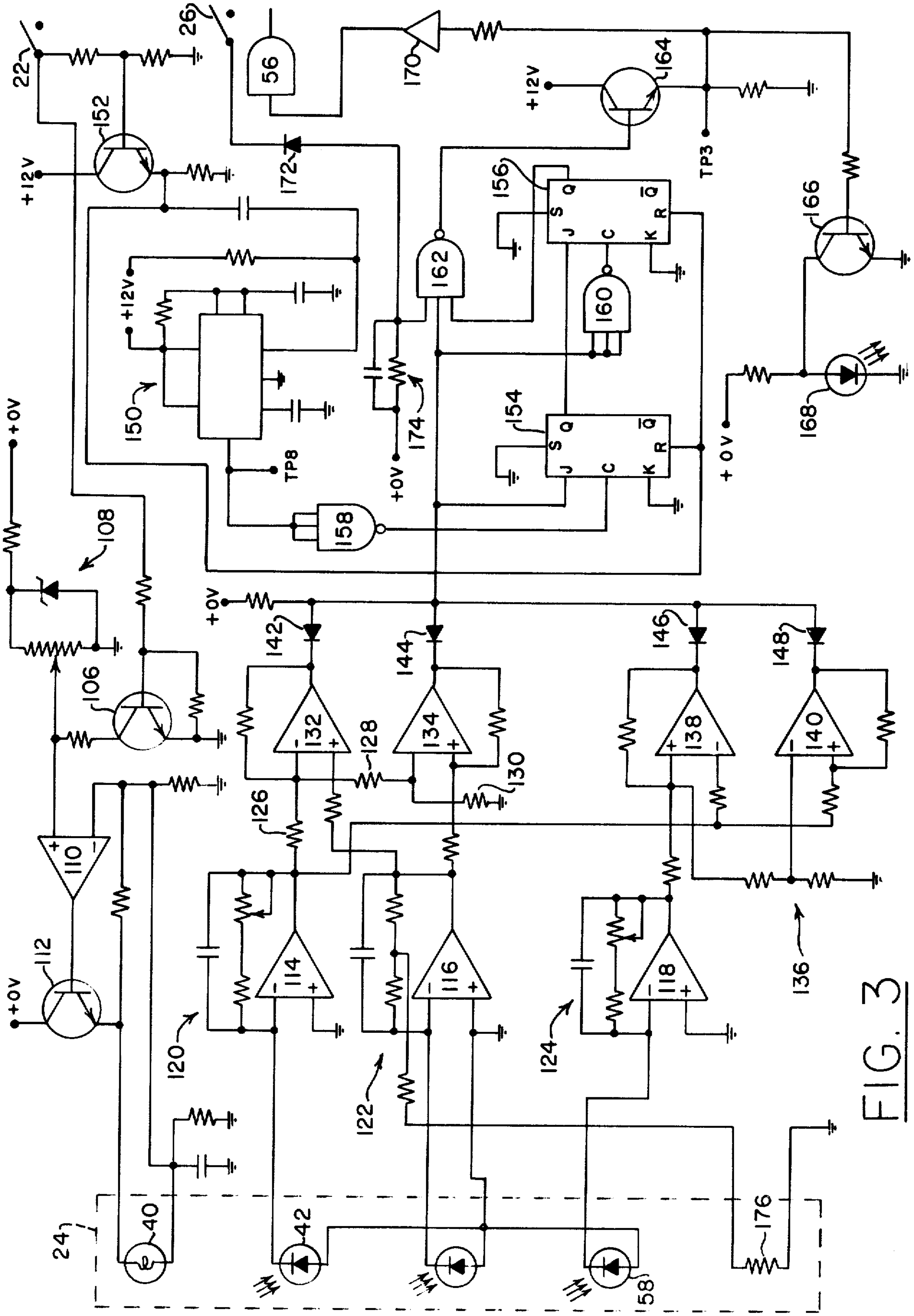
FIG. 3 is a schematic of the circuitry of the invention.

FIG. 3 shows, in schematic detail, the secondary detection circuitry 54 and the interconnection thereof with the color sensor 24. The tray switch 22 is connected to the normally conductive transistor circuit 106. The collector of the transistor is connected to a voltage control circuit, comprising a variable resistor in shunt with a zener diode, which is connected to a voltage source. Further connected to the collector of the transistor 106 is the operational amplifier 110, the output of which controls the transistor 112. With the transistor 106 normally conductive, the positive input of the amplifier 110 is held low such that the transistor 112 is gated off. However, when the tray switch 22 is actuated by placing of the paper 16 upon the tray 12, the transistor 106 is turned off, raising the voltage on the positive input of the amplifier 110 and gating the transistor 112 into conduction to illuminate the incandescent lamp 40 of the sensor 24.

The photocells 42,44 and the reference photocell 58 are respectively connected to amplifiers 114,116,118, each of which has associated therewith a feedback circuit 120,122,124 for achieving the desired gain. The output of the amplifier 114 is of an amplitude indicative of the light incident to the photocell 42, and similarly, the outputs of the amplifiers 116,118 are respectively indicative of the light incident to the cells 44,58.

In order to compensate for aging or "graying" of the various papers 16 which might be tested by the apparatus presented herein and to further compensate for any changes which might occur respecting the light output of the lamp 40, ratio tests are conducted upon the outputs of the various amplifiers 114–118. The output of the amplifier 114 is applied to the comparators 132,134 via the voltage divider comprising resistors 126,128,130. The other inputs to the comparators 132, 134 are supplied from the output of the amplifier 116. The comparators 132,134 thus compare the amount of light sensed by the photocells 42,44. By virtue of the voltage dividers 126–130, the output of the comparator 132 will be high if the light sensed by the photocell 44 is less than a first percentage of the light sensed by the photocell 42, and the output of the comparator 134 will be high if the light sensed by the photocell 44 is greater than a second percentage of the light sensed by the photocell 42. Thus, for the outputs of the comparators 132,134 to both be high, the relative values of light sensed by the photocells 42,44 must satisfy a predetermined relative relationship.

The output of the amplifier 118, indicative of the light sensed by the reference cell 58, is applied through a voltage divider 136 to the comparators 138,140. Also applied to these comparators is an output from the amplifier 114. As in the above situation, a high level output is emitted from the comparator 138 if the light sensed by the photocell 42 is less than a first percentage of the light sensed by the reference cell 58, and a high level output is emitted from the comparator 140 if the light sensed by the photocell 42 is greater than a second percentage of the light sensed by the reference cell 58. Consequently, high outputs will be evidenced by both the comparators 138,140 if the light sensed by the photocell 42 falls within a predetermined band width of that light sensed by the reference cell 58.

The outputs of the comparators 132,134,138,140 are commonly connected via the diodes 142–148. The junction of the diodes is connected through a resistor to a positive voltage source, and effectively creates a wire AND gate since the common point will only be high if the output of each of the comparators is high.

Also included as a portion of the circuitry 54 is a transistor 152 connected to the tray switch 22. Upon actuation of the tray switch 22, the transistor 152 enables flip-flops 154,156 which were held in the reset state and simultaneously actuates a timer 150. The timer is set such that the lamp 40 is allowed to turn on to full brightness and stabilize before a pulse is emitted to the inverter 158. The output of the inverter clocks the flip-flop 154 which receives, on the J input thereof, the outputs of the comparators 132,134, 138,140. If the light sensed by the photocells 42,44 and the reference cell 58 falls within the prescribed ratios, the J input of the flip-flop 154 will be at a high level and the flip-flop will be set. At this point in time, the color sensor 24 is positioned over the area 52 of the paper 16 and the tray has not yet begun to move. As the tray is moved rearwardly as shown in FIG. 1B, the ratio of light sensed by the photocells 42,44 and reference cell 58 should change such that the junction of the diodes 142–148 goes low, clocking the flip-flop 156 through the inverter 160 and setting the same by virtue of the interconnection of the Q output of the flip-flop 154 and the J input of the flip-flop 156. The output of the flip-flop 156 is applied to an input of the NAND gate 162.

As the tray 12 continues to travel, the area 50, of color characteristics like those of the area 52, passes under the color sensor 24 with the junction of the diodes 142–148 again going to a high level. This level is applied to an input of the NAND gate 162 as shown. The primary sensor actuation linkage 26, primary sensor 28, and color sensor 24 are so positioned that when the area 50 is under the color sensor 24, the primary sensor 28 is directly positioned over the grid pattern 36. The primary sensor 28 is then actuated upon contact of the cam linkage 26 by the tray 12, and the primary test is conducted in the ordinary manner. The cam linkage 26 includes a switch, actuated by the tray 12, which causes the diode 172 to become reverse biased. This results in an application of a high voltage level to a third input of the NAND gate 162 from the positive voltage source through the resistor 174. With the three inputs of the NAND gate 162 being at a high level as just discussed, the output thereof falls to a low level, turning off the transistor 164. The transistor 166 is gated off by the transistor 164 to allow the light emitting diode (LED) 168 to illuminate, indicating the passing of the secondary test. The low level output of the transistor 164 is applied to the inverter 170. The output of the inverter 170 passes to the AND gate 56 with the other input thereto being from the primary detection circuit. Thus, if both the primary and secondary tests are satisfied, a positive output is emitted from the AND gate 56 and a vending operation or other indication of authenticity of the paper 16 is made.

It should now be apparent that the secondary test conducted by the color sensor 24 and secondary detection circuit 54 will be satisfied, as evidenced by a low level output from the NAND gate 162 if, and only if, the colored areas 50,52 to be sensed upon the paper 16 exist in a particular sequence along the paper with the lastly sensed colored area 50 lying in a specific positional relationship with respect to the grid pattern 36.

In light of the foregoing it is apparent that selection of the filters 46,48 must be made with due consideration being given to the color of the areas 50,52 and the area lying therebetween. If, for example, on a valid paper, the areas 50,52 are generally red and the area lying therebetween is generally blue, the filter 46, over the photocell 44 would be a blue filter, while the filter 48 over the cell 42 would be a red filter. Consequently, when the color sensor 24 is positioned over either the areas 50,52, light will pass to the photocell 42 while being blocked from the cell 44. Similarly, when the color sensor 24 is sensing the area lying between the areas 50,52, the blue filter 46 will allow light to impinge upon the photocell 44 while the red filter 48 will block such light from the cell 42. Depending upon the colors to be tested on the paper 16, the filters 46,48 may take on a composite nature. For instance, if an area to be tested is green, then a combination of yellow and blue filters may be necessary, whereas a test for the color orange may require a combination of red and yellow filters. Further, if an area to be tested is green, a blue filter might be used with compensation being made in the voltage dividers or amplifier gains for the fact that the blue filter would allow the blue light component of the green area to impinge upon the associated cell. In any event, it should be apparent that one may readily select any combination of filters necessary for achieving the desired results.

Inasmuch as most electronic circuitry is temperature sensitive and, further, inasmuch as temperature sensitivity must be given special consideration when dealing with eletrical signals of small amplitude requiring high gain, the instant invention has included temperature compensation elements. Particularly, a thermistor 176 is included in the feedback circuitry associated with the photocell 44. This thermistor 176 modifies the gain of the amplifier 116 with temperature and thus compensates for the temperature related characteristics of the filter 46, cell 44, and amplifier 116, to cause the output of amplifier 116 to track that of amplifier 114 with temperature changes. With the outputs of the photocell 42 and reference cell 58 being compared via comparators 138,140, it is desirable that the circuits associated with the cells 42,58 be made to be either temperature insensitive or to track each other with temperature changes. By selecting the filters 84,86 associated with the reference cell 58 to be substantially identical to the filter 48 associated with the photosensor 42, it is relatively certain that, while the outputs of the cells' respective circuits may vary with temperature, the variance will be the same for each circuit and, hence, temperature will not effect the reliable operation thereof.

Thus it can be seen that the objects of the invention have been satisfied by the structure and technique presented hereinabove. While in accordance with the patent statutes only the best mode and preferred embodiment of the invention has been presented and described in detail, it is to be understood that the invention is not restricted thereto or thereby. Consequently, for an appreciation of the true scope and breadth of the invention, reference should be had to the following claims.

What is claimed is:

1. Apparatus for determining the authenticity of a paper purported to be a valid instrument, comprising:

first means for receiving and maintaining the paper;

a light source in juxtaposition to said first means and casting light upon the paper;

first and second photocells, adjacent said light source, receiving light of predetermined colors reflected from the same areas of the paper and emitting signals proportional to said light received; and a first comparator circuit means interconnected between said first and second photocells receiving said signals, and producing a first output signal when the light received by said first photocell is greater than a first percentage and less than a second percentage of the light received by said second photocell.

2. The apparatus as recited in claim 1, which further includes first and second color filters respectively interposed between said first and second photocells and the paper, said first and second filters being transmissive of light of different wavelengths.

3. The apparatus as recited in claim 3 which further includes a third photocell in juxaposition to and receiving light from said light source, and a second comparator circuit means interconnected between said second and third photocells for producing a second output signal when the light received by said second photocell is greater than a third percentage and less than a fourth percentage of the light received by said third photocell.

4. The apparatus as recited in claim 3 wherein said first means includes means for moving the paper along a path in juxtaposition to said light source and said photocells, and which further includes sequential gating circuit means connected to said first and second comparator circuit means and receiving said first and second output signals for creating a signal indicative of authenticity of the paper when said first and second output signals respectively coexist in a predetermined fashion.

5. The apparatus as recited in claim 3 which further includes a thermistor interconnected with said first comparator circuit means for termperature compensation and stabilization thereof.

6. The apparatus as recited in claim 5 which further includes a third color filter interposed between said light source and said third photocell, said third color filter transmitting light of the same wavelength as that transmitted by said second color filter.

7. The apparatus as recited in claim 1 wherein said light source comprises an incandescent lamp and which includes a unitary housing maintaining said lamp and said first and second photocells, said photocells being shielded from said lamp, and a third photocell in juxtaposition to and in light receiving communication with said lamp.

8. The apparatus as recited in claim 7 wherein said unitary housing is characterized by the presence of a first window, said first and second photocells positioned adjacent said first window and said lamp being maintained in light transmissive relationship therewith.

9. The apparatus as recited in claim 8 wherein said unitary housing is further characterized by the presence of a second window interposed between said lamp and said third photocell.

10. In an apparatus for determining the validity of a paper offered as a valid security, having a slidable tray for receiving the paper and transporting the same to a primary test position; a reticle sensor for scanning a grid pattern on the paper; and a primary circuit receiving an output from the reticle for determining, in the first instance, the validity of the paper; the improvement, comprising:

a lamp in juxtaposition to the tray and casting light upon a path across the paper as the tray transports the paper;

first and second photocells in juxtaposition to and receiving light reflected from said path, and a third photocell in light receiving positional relationship with said lamp, and first and second comparator circuit means interconnected between said first and second photocells and third and fourth comparator circuit means interconnected between said second and third photocells for producing a first output signal when the light received by the first photocell is greater than a first percentage and less than a second percentage of the light received by said second photocell and the light received by said second photocell is greater than a third percentage and less than a fourth percentage of the light received by said third photocell.

11. The improvement according to claim 10 which further includes first and second color filters respectively interposed between said first and second photocells and said path, and a third color filter interposed between said lamp and said third photocell, said first and second color filters being transmissive to light of different wavelengths, and said second and third color filters being transmissive to light of the same wavelength.

12. The improvement according to claim 10 which further includes sequential gating circuit means interconnected between said first, second, third, and fourth comparator circuit means, and creating a second output signal when the first output signal occurs in a predetermined sequence and is coexistent with scanning of the grid pattern by the reticle sensor.

* * * * *